United States Patent
Nakahashi et al.

(10) Patent No.: US 8,549,200 B2
(45) Date of Patent: Oct. 1, 2013

(54) MULTIPROCESSOR SYSTEM CONFIGURED AS SYSTEM LSI

(75) Inventors: Isamu Nakahashi, Tokyo (JP); Nobuhide Takaba, Yokohama (JP); Kazuki Matsuda, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 422 days.

(21) Appl. No.: 12/574,769

(22) Filed: Oct. 7, 2009

(65) Prior Publication Data

US 2010/0106876 A1    Apr. 29, 2010

(30) Foreign Application Priority Data

Oct. 24, 2008    (JP) ................... 2008-273976

(51) Int. Cl.
*G06F 13/24*   (2006.01)
*G06F 1/00*    (2006.01)

(52) U.S. Cl.
USPC ........... 710/261; 710/260; 710/266; 710/267; 710/268; 713/300; 713/310; 713/320; 713/323; 713/324

(58) Field of Classification Search
USPC ......... 710/260, 261, 266, 267, 268; 713/300, 713/310, 320, 323, 324
See application file for complete search history.

(56) References Cited

U.S. PATENT DOCUMENTS

| | | | | |
|---|---|---|---|---|
| 5,428,799 A | * | 6/1995 | Woods et al. | 710/266 |
| 5,560,019 A | * | 9/1996 | Narad | 710/260 |
| 5,574,505 A | * | 11/1996 | Lyons et al. | 375/240.26 |
| 6,813,665 B2 | * | 11/2004 | Rankin et al. | 710/260 |
| 6,952,749 B2 | * | 10/2005 | Kim | 710/260 |
| 7,099,275 B2 | * | 8/2006 | Sarkinen et al. | 370/230 |
| 7,517,162 B2 | * | 4/2009 | Aizawa | 400/62 |
| 7,633,885 B2 | * | 12/2009 | Kuranari et al. | 370/254 |
| 7,769,938 B2 | * | 8/2010 | Kaushik et al. | 710/268 |
| 7,899,966 B2 | * | 3/2011 | Kulkarni | 710/267 |
| 7,962,771 B2 | * | 6/2011 | Song et al. | 713/300 |
| 8,024,504 B2 | * | 9/2011 | Railing et al. | 710/260 |

(Continued)

FOREIGN PATENT DOCUMENTS

| | | |
|---|---|---|
| GB | 2 277 388 A | 10/1994 |
| JP | 03-081834 | 4/1991 |

(Continued)

OTHER PUBLICATIONS

Office action issued by the Japanese Patent Office on Sep. 4, 2012 in the corresponding Japanese patent application No. 2008-273976.

*Primary Examiner* — Brian Misiura
(74) *Attorney, Agent, or Firm* — Staas & Halsey LLP

(57) ABSTRACT

A multiprocessor system includes a plurality of processor units each transmitting an interrupt request signal indicating an interrupt request for which an interrupt-request destination processor unit is specified and receiving an interrupt signal and an interrupt control circuit receiving the interrupt request signal from each of the plurality of processor units and transmitting the interrupt signal to each of the plurality of processor units, wherein, the interrupt control circuit transmits the interrupt signal to the interrupt-request destination processor unit specified by the interrupt request signal if the specified interrupt-request destination processor unit is not in a low power consumption state and transmits the interrupt signal to another processor unit different from the processor unit specified by the interrupt request signal if the specified interrupt-request destination processor unit is in the low power consumption state.

5 Claims, 8 Drawing Sheets

(56) References Cited

U.S. PATENT DOCUMENTS

| | | | |
|---|---|---|---|
| 8,032,680 B2* | 10/2011 | Ganguly | 710/264 |
| 8,032,681 B2* | 10/2011 | Crossland et al. | 710/267 |
| 2004/0068598 A1* | 4/2004 | Sakugawa | 710/260 |
| 2005/0273652 A1 | 12/2005 | Okawa et al. | |
| 2008/0172511 A1 | 7/2008 | Takata et al. | |
| 2009/0204826 A1* | 8/2009 | Cox et al. | 713/320 |
| 2012/0054750 A1* | 3/2012 | Saripalli | 718/100 |

FOREIGN PATENT DOCUMENTS

| | | |
|---|---|---|
| JP | 4-302352 | 10/1992 |
| JP | 6-324996 | 11/1994 |
| JP | 10-171770 | 6/1998 |
| JP | 2004-78642 | 3/2004 |
| JP | 2005-332402 | 12/2005 |
| JP | 2007-172322 | 7/2007 |
| JP | 2008-176360 | 7/2008 |

* cited by examiner

FIG. 2

|  | | DESTINATION OF INTERRUPT REQUEST | | |
|---|---|---|---|---|
|  | | CPU1 | CPU2 | CPU3 |
| DESTINATION OF INTERRUPT SIGNAL | CPU1 | 1 | 3 | 2 |
| | CPU2 | 2 | 1 | 3 |
| | CPU3 | 3 | 2 | 1 |

FIG. 3

|  | DESTINATION OF INTERRUPT REQUEST ||||||
|---|---|---|---|---|---|---|
|  |  | CPU1 | CPU2 | CPU3 | CPU4 | ··· | CPUn |
| DESTINATION OF INTERRUPT SIGNAL | CPU1 | 1 | n | n-1 | n-2 | ··· | 2 |
|  | CPU2 | 2 | 1 | n | n-1 | ··· | 3 |
|  | CPU3 | 3 | 2 | 1 | n | ··· | 4 |
|  | CPU4 | 4 | 3 | 2 | 1 | ··· | 5 |
|  | ··· | ··· | ··· | ··· | ··· | ··· | ··· |
|  | CPUn | n | n-1 | n-2 | n-3 | ··· | 1 |

FIG. 4

|  |  | DESTINATION OF INTERRUPT REQUEST FROM CPU 1 || DESTINATION OF INTERRUPT REQUEST FROM CPU 2 || DESTINATION OF INTERRUPT REQUEST FROM CPU 3 ||
|---|---|---|---|---|---|---|---|
|  |  | CPU2 | CPU3 | CPU1 | CPU3 | CPU1 | CPU2 |
| DESTINATION OF INTERRUPT SIGNAL | CPU1 | --- | --- | 1 | 1 | 1 | 1 |
|  | CPU2 | 1 | 1 | --- | --- | 2 | 2 |
|  | CPU3 | 2 | 2 | 2 | 2 | --- | --- |

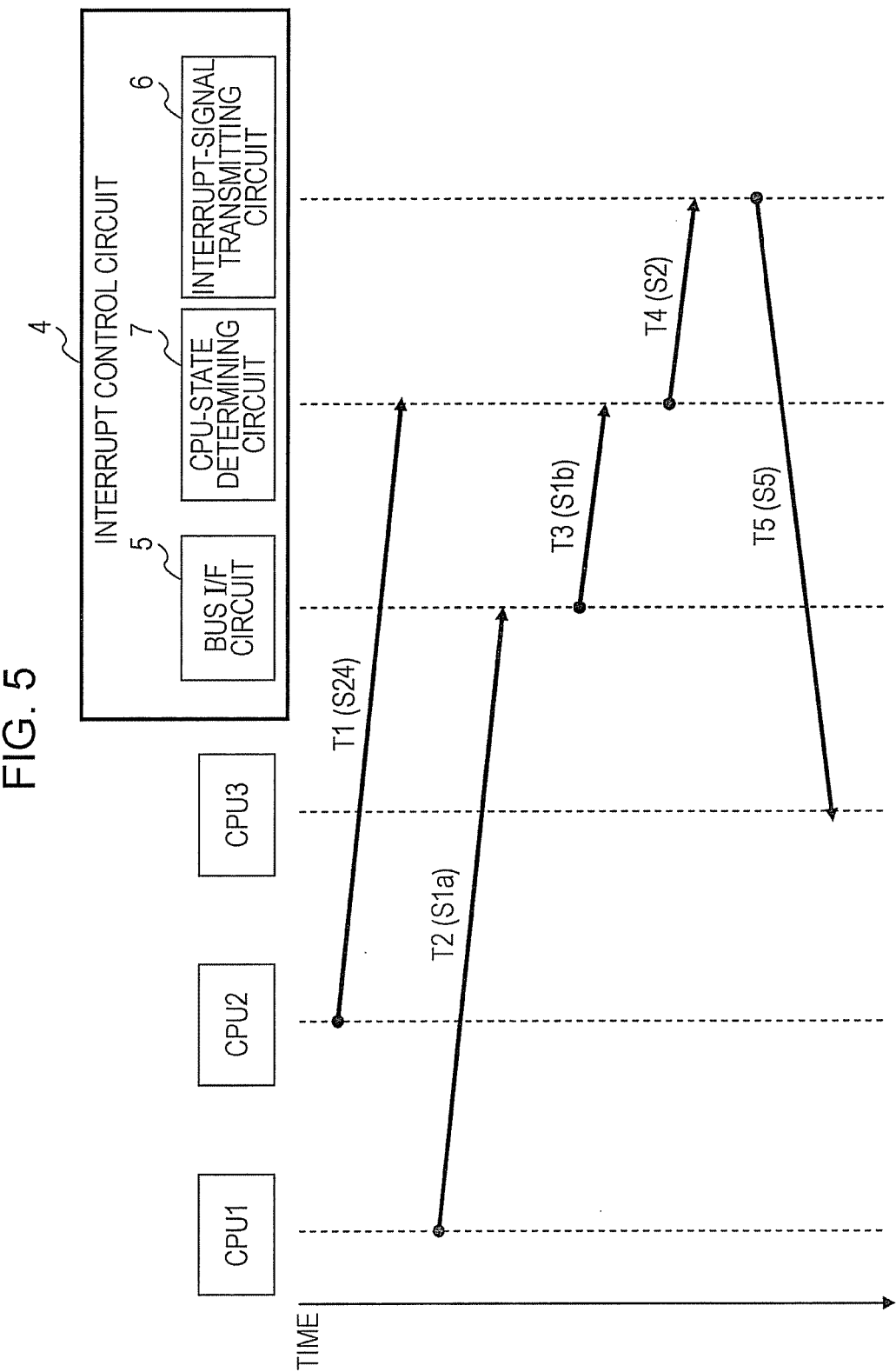

MULTIPROCESSOR SYSTEM CONFIGURED AS SYSTEM LSI

CROSS REFERENCES TO RELATED APPLICATIONS

This application is based upon and claims the benefit of priority from the prior Japanese Patent Application No. 2008-273976 filed on Oct. 24, 2008, the entire contents of which are incorporated herein by reference.

FIELD

Various embodiments described herein relate to a multiprocessor system configured as a system large scale integrated circuit (LSI). The multiprocessor system includes an interrupt control circuit.

BACKGROUND

Multiprocessor systems configured as system LSIs each have multiple processor units (hereinafter referred to as central processing units (CPUs)) implemented on a chip. The multiple CPUs perform, for example, parallel processing and cooperative processing. The CPUs pass the processing to each other in response to interrupt functioning as a trigger. In a typical multiprocessor system configured as a system LSI in the related art, an interrupt-request destination CPU submits an interrupt request to an interrupt-request destination CPU that is specified by the interrupt-request destination CPU. The interrupt-request destination CPU stops the processing that is being performed in response to the interrupt request and performs certain interrupt processing, for example, taking over of the processing that has been performed by the interrupt-request destination CPU.

The multiprocessor system is required to operate in a low power consumption state to achieve power saving control. The low power consumption state in which the power consumption by each CPU is reduced means adopting at least one of the following three methods: (1) a clock signal to be applied to each CPU is stopped or the frequency of the clock signal is decreased, (2) a clock signal is applied to each CPU but a clock signal to be applied to each circuit excluding some circuits including an interrupt determining circuit in the CPU is stopped, and (3) the power voltage to each CPU is decreased or is set to zero volts.

The above low power consumption state is generally called, for example, a sleep state, a shutdown state, a standby state, or a power-down state. Specifically, the operations of CPUs that are not required to perform real-time processing, among the CPUs in the multiprocessor system configured as a system LSI, are restricted to reduce the power consumption.

Japanese Laid-open Patent Publication No. 2004-78642 discloses a circuit capable of changing the length of an interrupt signal into a length that may be recognized by each processor in response to a variation in frequency of the internal operation of the processor, caused by a reduced power consumption.

Japanese Laid-open Patent Publication No. 3-81834 discloses an interrupt control apparatus in a multiprocessor system, which simultaneously transmits interrupt signals to multiple processors.

Japanese Laid-open Patent Publication No. 2005-332402 discloses a technology in a multiprocessor system, in which a main processor arranging the processing schedule monitors each sub-processor and reallocates processing to the sub-processors depending on the situation so that the operation of the entire multiprocessor system may be ensured even if an error occurs in the sub-processor.

SUMMARY

A multiprocessor system configured as a system LSI, the multiprocessor system including a plurality of processor units each transmitting an interrupt request signal indicating an interrupt request for which an interrupt-request destination processor unit is specified and receiving an interrupt signal and an interrupt control circuit receiving the interrupt request signal from each of the plurality of processor units and transmitting the interrupt signal to each of the plurality of processor units, wherein, in response to the interrupt request signal transmitted from each of the plurality of processor units, the interrupt control circuit transmits the interrupt signal to the interrupt-request destination processor unit specified by the interrupt request signal if the specified interrupt-request destination processor unit is not in a low power consumption state and transmits the interrupt signal to another processor unit different from the processor unit specified by the interrupt request signal if the specified interrupt-request destination processor unit is in the low power consumption state.

The object and advantages of the embodiments described herein will be realized and attained by means of the elements and combinations particularly pointed out in the claims.

It is to be understood that both the foregoing general description and the following detailed description are exemplary and explanatory and are not restrictive of the embodiments described herein, as claimed.

BRIEF DESCRIPTION OF THE DRAWINGS

FIG. 2 is a table of an example of an interrupt-destination priority order table;

FIG. 3 is a table of an example of a general interrupt-destination priority order table when n-number CPUs exits;

FIG. 4 is a table of another example of the interrupt-destination priority order table;

FIG. 5 illustrates the relationship between time and the flow of signals transmitted to the components in the multiprocessor system according to the first embodiment;

DESCRIPTION OF EMBODIMENTS

Embodiments will herein be described with reference to the attached drawings. It is to be understood that the technical scope of the invention is not limited to the disclosed exemplary embodiments and the scope of the claims is to be accorded the broadest interpretation so as to encompass all modifications and equivalent structures and functions.

As described above, if an interrupt request is submitted to a CPU in a low power consumption state in a typical multiprocessor system configured as a system LSI in the related art, the CPU in the low power consumption state is recovered to a normal operation state to cause an increase in the power consumption. However, submitting the interrupt signal to another CPU in the normal operation state, instead of to the CPU in the low power consumption state, allows the CPU in the low power consumption state to keep its state, thus suppressing an increase in the power consumption.

Accordingly, a multiprocessor system configured as a system LSI according to the embodiments described herein includes an interrupt control circuit that determines the power consumption state of an interrupt-request destination CPU and automatically changes the interrupt destination if the interrupt-request destination CPU is in the low power consumption state. A CPU that is not in the low power consumption state is selected as the interrupt destination CPU. Although the low power consumption state of the CPU is exemplified as the sleep state in the following description, the low power consumption state of the CPU is not restricted to the sleep state, as described above.

[First Embodiment]

Figure 1:
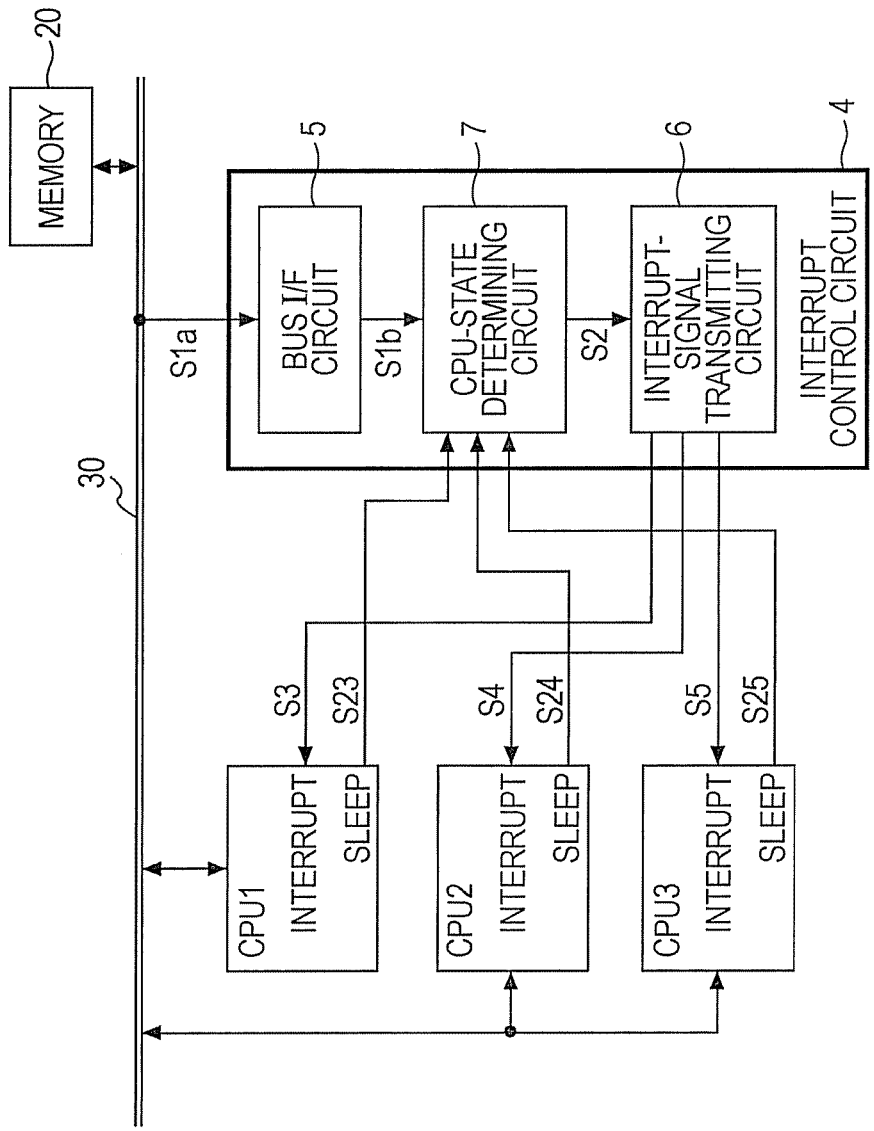
FIG. 1 is a block diagram of an example of the configuration of a multiprocessor system according to a first embodiment.

FIG. 1 is a block diagram of an example of the configuration of a multiprocessor system according to a first embodiment. Referring to FIG. 1, the multiprocessor system includes three CPUs 1 to 3 for description and also includes an interrupt control circuit 4 controlling the interrupt. The interrupt control circuit 4 includes a bus interface circuit 5, a CPU-state determining circuit 7, and an interrupt-signal transmitting circuit 6. The CPUs 1 to 3, the interrupt control circuit 4, and a memory 20 are connected to each other via a bus 30.

An outline of the first embodiment will now be described. Each CPU transmits an interrupt request signal S1a for which an interrupt-request destination CPU is specified to the interrupt control circuit 4 functioning as an intermediary of the interrupt. The interrupt control circuit 4 refers to a sleep signal (a state signal indicating its own low power consumption state) output from the interrupt-request destination CPU in response to the interrupt request signal S1a to determine the power consumption state of the interrupt-request destination CPU, that is, to determine whether the interrupt-request destination CPU is in the sleep state (the low power consumption state). The interrupt control circuit 4 transmits an interrupt signal S3. S4, or S5 to the interrupt-request destination CPU if the interrupt-request destination CPU is not in the sleep state and changes the interrupt destination CPU to another CPU if the interrupt-request destination CPU is in the sleep state. According to the first embodiment, the interrupt control circuit 4 refers to an interrupt-destination priority order table in which the priority order of each CPU as the interrupt destination is defined in the change of the interrupt destination to select a CPU that is not in the sleep state and transmits the interrupt signal to the selected CPU.

The function and operation of each component composing the multiprocessor system of the first embodiment will now be described. Each CPU performs processing in response to an instruction in a program read out from the memory 20. An interruption-request source CPU 1, 2, or 3 transmits the interrupt request signal S1a for which an interrupt-request destination CPU is specified to the interrupt control circuit 4, if necessary. The CPU 1, 2, or 3 transmits a sleep signal S23. S24, or S25, respectively, indicating that the CPU is in the sleep state to the CPU-state determining circuit 7 before the CPU enters the sleep state. The CPUs 1 to 3 may have different processing speeds. For example, the CPU 1 may be a main processor that has a processing speed higher than those of the other CPUs and that performs centralized control of the other CPUs.

The bus interface circuit 5 receives the interrupt request signal S1a transmitted from each CPU through the bus 30, determines which CPU the interrupt signal is submitted to on the basis of the interrupt request signal S1a, and transmits the determination result to the CPU-state determining circuit 7 as an interrupt request signal S1b indicating the interrupt-request destination CPU.

The CPU-state determining circuit 7 refers to the sleep signal S23. S24, and S25 received from the CPUs 1, 2, and 3, respectively, to determine the sleep states of the CPUs. Specifically, the CPU-state determining circuit 7 refers to the sleep signal of the interrupt-request destination CPU in response to the interrupt request signal S1b indicating the interrupt-request destination CPU. The CPU-state determining circuit 7 selects the interrupt-request destination CPU as the interrupt destination CPU to which the interrupt signal is transmitted if the interrupt-request destination CPU is not in the sleep state and changes the interrupt destination CPU to another CPU if the interrupt-request destination CPU is in the sleep state. In other words, if the interrupt-request destination CPU is in the sleep state, the interrupt destination is automatically changed to another CPU.

In addition, the CPU-state determining circuit 7 selects a CPU that is not in the sleep state and is in the normal operation state as the interrupt destination CPU in the change of the interrupt destination, and transmits an interrupt destination signal S2 indicating the interrupt destination CPU to the interrupt-signal transmitting circuit 6. How to change the interrupt destination CPU will be described in detail below.

The interrupt-signal transmitting circuit 6 transmits the interrupt signal S3. S4, or S5 to the CPU corresponding to the received interrupt destination signal S2. The CPU that has received the interrupt signal stops the processing that is being performed by using the interrupt signal as a trigger and performs certain interrupt processing.

How the CPU-state determining circuit 7 changes the interrupt destination will now be described. According to the first embodiment, the CPU-state determining circuit 7 refers to the interrupt-destination priority order table in which the order of the change is indicated in the change of the interrupt destination. For example, if the interrupt-request destination CPU indicated by the interrupt request signal S1b is in the sleep state, the CPU-state determining circuit 7 determines which CPU the interrupt destination is changed to on the basis of the interrupt-destination priority order table. In other words, the priority order of each CPU as the interrupt destination is defined in advance in the interrupt-destination priority order table. The CPU-state determining circuit 7 may include the interrupt-destination priority order table as a register.

FIG. 2 is a table of an example of the interrupt-destination priority order table. In the interrupt-destination priority order table depicted in FIG. 2, each column indicates the interrupt-request destination CPU indicated by the interrupt request signal S1b and each row indicates the interrupt destination CPU to which the interrupt signal S3, S4, or S5 is transmitted. The priority order of each CPU in the transmission of the interrupt signal is indicated in the interrupt-destination priority order table for every interrupt-request destination CPU to which the interrupt request is submitted.

Since the interrupt-request destination CPU has a priority order "1" indicating the highest priority in the interrupt-destination priority order table depicted in FIG. 2, the CPU-state determining circuit 7 first selects the interrupt-request destination CPU corresponding to the interrupt request signal S1b as the interrupt destination CPU. The CPU-state determining circuit 7 refers to the sleep signal of the interrupt-request destination CPU to determine whether the interrupt-request destination CPU is in the sleep state. If the interrupt-request destination CPU is in the sleep state, the CPU-state determining circuit 7 selects a CPU that is different from the interrupt-request destination CPU and that has a priority order "2" indicating the second highest priority as the interrupt destination CPU. As described above, the CPU that is not in the sleep state is selected as the interrupt destination CPU in accordance with the priority order in the interrupt-destination priority order table in which the interrupt-request destination CPU has the highest priority order.

For example, it is assumed that the CPU 2 is in the sleep state and the CPUs 1 and 3 are in the normal operation state. If the CPU 1 transmits the interrupt request signal S1a for which the interrupt request destination is set to the CPU 2 to the interrupt control circuit 4, the CPU-state determining circuit 7 refers to the priority orders of the interrupt destination CPUs indicated in the column corresponding to the interrupt-request destination CPU 2 in the interrupt-destination priority order table depicted in FIG. 2. In the column corresponding to the interrupt-request destination CPU 2, the CPU 2 has the highest priority order, the CPU 3 has the second highest priority order, and the CPU 1 has the lowest priority order. Accordingly, the CPU-state determining circuit 7 first refers to the sleep signal of the CPU 2. Since the sleep signal is output from the CPU 2, the CPU-state determining circuit 7 determines that the CPU 2 is in the sleep state and changes the interrupt destination to the CPU 3 having the second highest priority order. The CPU-state determining circuit 7 refers to the sleep signal of the CPU 3 and determines that the CPU 3 is in the normal operation state because no sleep signal is output from the CPU 3. As a result, the CPU-state determining circuit 7 selects the CPU 3 as the interrupt destination.

If the CPU 3 is also in the sleep state, the interrupt signal is transmitted to the CPU 1, which is the interrupt-request source CPU. In this case, the CPU 1 may not submit the interrupt request by using the interrupt signal as a trigger. Alternatively, if the CPU 3 is also in the sleep state, the CPU-state determining circuit 7 may adopt another interrupt controlling method, for example, in which the interrupt-request destination CPU 2 is forcedly selected as the interrupt destination CPU despite the fact that the CPU 2 is in the sleep state.

FIG. 3 is a table of an example of a general interrupt-destination priority order table when n-number CPUs exits. Also in the interrupt-destination priority order table in FIG. 3, each column indicates the interrupt-request destination CPU indicated by the interrupt request signal S1b and each row indicates the interrupt destination CPU to which the interrupt signal S3, S4, or S5 is transmitted, as in the example in FIG. 2. The interrupt-request destination CPU has a priority order "1" indicating the highest priority and the other CPUs have priority orders "2" to "n". In other words, the priority orders of the interrupt destination CPUs to which the interrupt signal is transmitted when the interrupt-request destination CPU is in the sleep state are depicted as "2" to "n". In the interrupt-destination priority order table depicted in FIG. 3, the highest priority order "1" is set to the interrupt-request destination CPU, the higher priority orders are allocated to the other CPUs having the smaller CPU numbers, and the priority orders are sequentially set to the CPUs beginning with the CPU 1 in the same manner since the CPU D.

For example, it is assumed that the CPU 1 transmits the interrupt request signal S1a for which the interrupt request destination is set to the CPU 2 to the interrupt control circuit 4 when only the CPUs 2 and 3 are in the sleep state and the other CPUs are in the normal operation state in a multiprocessor system on which n-number CPUs are implemented. In the interrupt-destination priority order table depicted in FIG. 3, the interrupt destination CPUs having smaller CPU numbers have higher priority orders. Since the sleep signal is output from the CPU 2, which is the interrupt request destination, the CPU 3 is selected as the next interrupt destination. However, since the sleep signal is output also from the CPU 3, the CPU 4 is selected as the next interrupt destination. Since no sleep signal is output from the CPU 4, the CPU 4 is selected as the interrupt destination CPU.

In addition, since the priority orders are sequentially set in the interrupt-destination priority order table depicted in FIG. 3, as described above, the interrupt destination is not biased toward one CPU and the interrupt destination is stochastically equally allocated to each CPU. Accordingly, the interrupt-destination priority order table depicted in FIG. 3 is effective for configuration of a multiprocessor system using multiple CPUs between which no special difference in the priority order exists and which have similar power consumptions.

An example of how to change the settings in the interrupt-destination priority order table depicted in FIG. 3 will now be described. In this example, it is assumed that the power consumptions are increased with the increasing CPU numbers and that the priority order of the interrupt-request destination CPU is set to "1" and the higher priority orders are allocated to the other CPUs having the smaller CPU numbers, as in the example in FIG. 3. Specifically, the power consumption is increased with the increasing CPU number and the priority order is decreased with the increasing CPU number. Setting the interrupt-destination priority order table in the above manner causes the CPU having the lowest power consumption to be selected as the interrupt destination in the change of the interrupt destination in the multiprocessor system on which n-number CPUs having different power consumptions are implemented.

Specifically, in the change of the interrupt destination CPU when the interrupt-request destination CPU is in the sleep state, the priority orders 2 to n of the interrupt destination CPUs are set in the ascending orders of the CPU numbers and in the ascending orders of the power consumptions. Accordingly, the CPU that is in the normal operation state and that has the lowest power consumption is selected as the interrupt destination CPU. Furthermore, the power consumption is generally increased with the increasing processing speed of the CPU. When the smaller CPU numbers are allocated to the CPUs having the higher power consumptions, it is possible to cause the CPU having the higher processing speed to perform the processing by priority and, thus, this allocation method is effective for, for example, high-speed processing.

The interrupt destination CPU is determined in accordance with its priority order in the examples in FIGS. 2 and 3. Specifically, the sleep signals of the CPUs are sequentially referred to in order to select the CPU that has the higher priority order and that is in the normal operation state as the interrupt destination CPU. However, in the actual logical configuration of a signal circuit, after the CPUs in the normal operation state are extracted on the basis of the sleep signals of all the CPUs, the CPU having the highest interrupt-destination priority order may be selected from the extracted CPUs in the normal operation state as the interrupt destination CPU by referring to the interrupt-destination priority order table.

FIG. 4 is a table of another example of the interrupt-destination priority order table. In the interrupt-destination priority order table depicted in FIG. 4, each column indicates the interruption-request source CPU and is further divided into sub-columns corresponding to the interrupt-request destination CPUs indicated by the interrupt request signal S1b. Since no interrupt request is submitted to the interruption-request source CPU, the interruption-request source CPU is not included in the interrupt-request destination CPUs. In the interrupt-destination priority order table depicted in FIG. 4, each row indicates the interrupt destination CPU to which the interrupt signal S3. S4, or S5 is transmitted. The priority order of each CPU to which the interrupt signal is transmitted is indicated for every combination of the interruption-request source CPU and the interrupt-request destination CPU in the interrupt-destination priority order table in FIG. 4.

As described above, the columns in the interrupt-destination priority order table in FIG. 4 are defined by both the interruption-request source CPUs and the interrupt-request destination CPUs, unlike the columns defined by only the interrupt-request destination CPUs in the interrupt-destination priority order tables in FIGS. 2 and 3. Accordingly, it is possible to make the interrupt settings in more detail, if needed.

Furthermore, the higher priority orders are set to the CPUs having the smaller numbers in the interrupt-destination priority order table in FIG. 4. Accordingly, as described above with reference to FIG. 3, allocating the smaller CPU numbers to the CPUs having the lower power consumptions causes the CPUs having the lower power consumptions to have the higher priority orders as the interrupt destination CPU. In addition, the CPU that is in the normal operation state and that has the lowest power consumption is selected as the interrupt destination CPU on the basis of the interruption-request source CPU, regardless of the interrupt-request destination CPU.

An example of the operation when the interrupt-destination priority order table depicted in FIG. 4 is used will now be described. For example, it is assumed that the CPU 2 outputs the sleep signal to be in the sleep state and the CPUs 1 and 3 are in the normal operation state. If the CPU 1 transmits the interrupt request signal S1a for which the interrupt request destination is set to the CPU 2 to the interrupt control circuit 4, the CPU-state determining circuit 7 refers to the priority orders of the interrupt destination CPUs indicated in the leftmost column corresponding to the interrupt-request destination CPU 2 in the interrupt-destination priority order table in FIG. 4. The priority order of the interrupt destination CPU is not set for the CPU 1, which is the interruption-request source CPU, as described above. The CPU 2 has the higher priority order and the CPU 3 has the lower priority order. The CPU-state determining circuit 7 refers to the sleep signal of the CPU 2 and determines that the CPU 2 is in the sleep state because the sleep signal is output from the CPU 2. The CPU-state determining circuit 7 changes the interrupt destination to the CPU 3 having the next highest priority order. The CPU-state determining circuit 7 refers to the sleep signal of the CPU 3 and determines that the CPU 3 is in the normal operation state because no sleep signal is output from the CPU 3. As a result, the CPU-state determining circuit 7 selects the CPU 3 as the interrupt destination. As in the interrupt-destination priority order table of in FIG. 2, if the CPU 3 is also in the sleep state, the CPU-state determining circuit 7 may adopt another interrupt controlling method, for example, in which the interrupt-request destination CPU 2 is forcedly selected as the interrupt destination CPU despite the fact that the CPU 2 is in the sleep state.

An example of an interrupt operation process will now be specifically described with reference to FIGS. 1 and 5. FIG. 5 illustrates the relationship between time and the flow of signals transmitted to the components in the multiprocessor system according to the first embodiment. Reference numerals in parentheses in FIG. 5 correspond to the transmission and reception signals depicted in FIG. 1. It is assumed here that, after the CPU 2 outputs the sleep signal to be in the sleep state when all the CPUs are normally operating, the CPU 1 submits the interrupt request to the CPU 2. It is also assumed that the CPU-state determining circuit 7 changes the interrupt destination in accordance with the interrupt-destination priority order table depicted in FIG. 2.

Referring to FIG. 5, in Step T1, the CPU 2 transmits the sleep signal S24 to the CPU-state determining circuit 7 in the interrupt control circuit 4 and enters the sleep state. In Step T2, the CPU 1 transmits the interrupt request signal S1a to the bus interface circuit 5 in the interrupt control circuit 4 through the bus 30 in order to submit the interrupt request to the CPU 2. In Step T3, the bus interface circuit 5 determines that the interrupt request is submitted to the CPU 2 from the received interrupt request signal S1a and transmits the determination result to the CPU-state determining circuit 7 as the interrupt request signal S1b.

The CPU-state determining circuit 7 refers to the sleep signals S23. S24, and S25 indicating the sleep states of the CPUs 1, 2, and 3, respectively, and the interrupt-destination priority order table depicted in FIG. 2 in response to the interrupt request to the CPU 2, indicated by the interrupt request signal S1b. The CPU-state determining circuit 7 changes the interrupt destination to the CPU 3 having the next higher priority order because the CPU 2 is in the sleep state. Since the CPU 3 is in the normal operation state, the CPU-state determining circuit 7 selects the CPU 3 as the interrupt destination CPU. In Step T4, the CPU-state determining circuit 7 transmits the interrupt destination signal S2 indicating that the CPU 3 is the interrupt destination CPU to the interrupt-signal transmitting circuit 6.

In Step T5, the interrupt-signal transmitting circuit 6 transmits the interrupt signal 85 to the CPU 3 in response to the received interrupt destination signal S2. The CPU 3, which has received the interrupt signal S5, stops the processing that is being performed by using the interrupt signal S5 as a trigger and takes over the processing that has been performed by the CPU 1. Specifically, the CPU 3 reads out an instruction in a program that has been executed by the CPU 1 and that is to be interrupted from the memory 20 and executes the readout instruction. After the execution, the CPU 3 transmits an interrupt processing completion signal to the CPU 1.

As described above, according to the first embodiment, when the interrupt-request destination CPU is in the low power consumption state, the interrupt destination is changed to a CPU that is not in the low power consumption state in accordance with the interrupt-destination priority order table. In addition, changing the settings in the interrupt-destination priority order table allows the interrupt controlling method in the multiprocessor system to be appropriately changed.

A register indicating the power consumption state of each CPU may be provided. In this case, the interruption-request source CPU may refer to the register to submit the interrupt request to a CPU that is not in the low power consumption state. However, since it is necessary for the CPU to refer to the register for every interrupt request, a reduction in system performance may be caused. In contrast, according to the first embodiment, the CPU may submit the interrupt request to a CPU that is not in the low power consumption state only by transmitting the interrupt request signal, so that a reduction in the system performance is not caused.

In the interrupt-destination priority order table in FIG. 4, the same priority order is set for each interrupt destination CPU in the column corresponding to each interruption-request source CPU. In this case, the priority order of each interrupt destination CPU is determined on the basis of the interruption-request source CPU, regardless of the interrupt-request destination CPU. In other words, with the interrupt-destination priority order table in FIG. 4, it is not necessary to specify the interrupt-request destination CPU and the interrupt destination CPU may be determined in accordance with the interrupt-destination priority order table in response to the interrupt request.

With such a interrupt-destination priority order table, each CPU transmits the interrupt request signal for which no interrupt-request destination CPU is specified to the interrupt control circuit 4. Upon reception of the interrupt request signal, the CPU-state determining circuit 7 selects a CPU that is not in the sleep state as the interrupt destination CPU on the basis of the interrupt-destination priority order table and transmits the interrupt signal to the selected interrupt destination CPU. As described above, when the priority orders of the CPUs are set in the ascending order of the power consumption in the interrupt-destination priority order table, it is possible to save the power consumption in the LSI. In contrast, when the priority orders of the CPUs are set in the descending order of the processing speed, it is possible to save the power consumption and to achieve high-speed processing in association with the selection of a CPU that is not in the sleep state.

[Second Embodiment]

Figure 6:
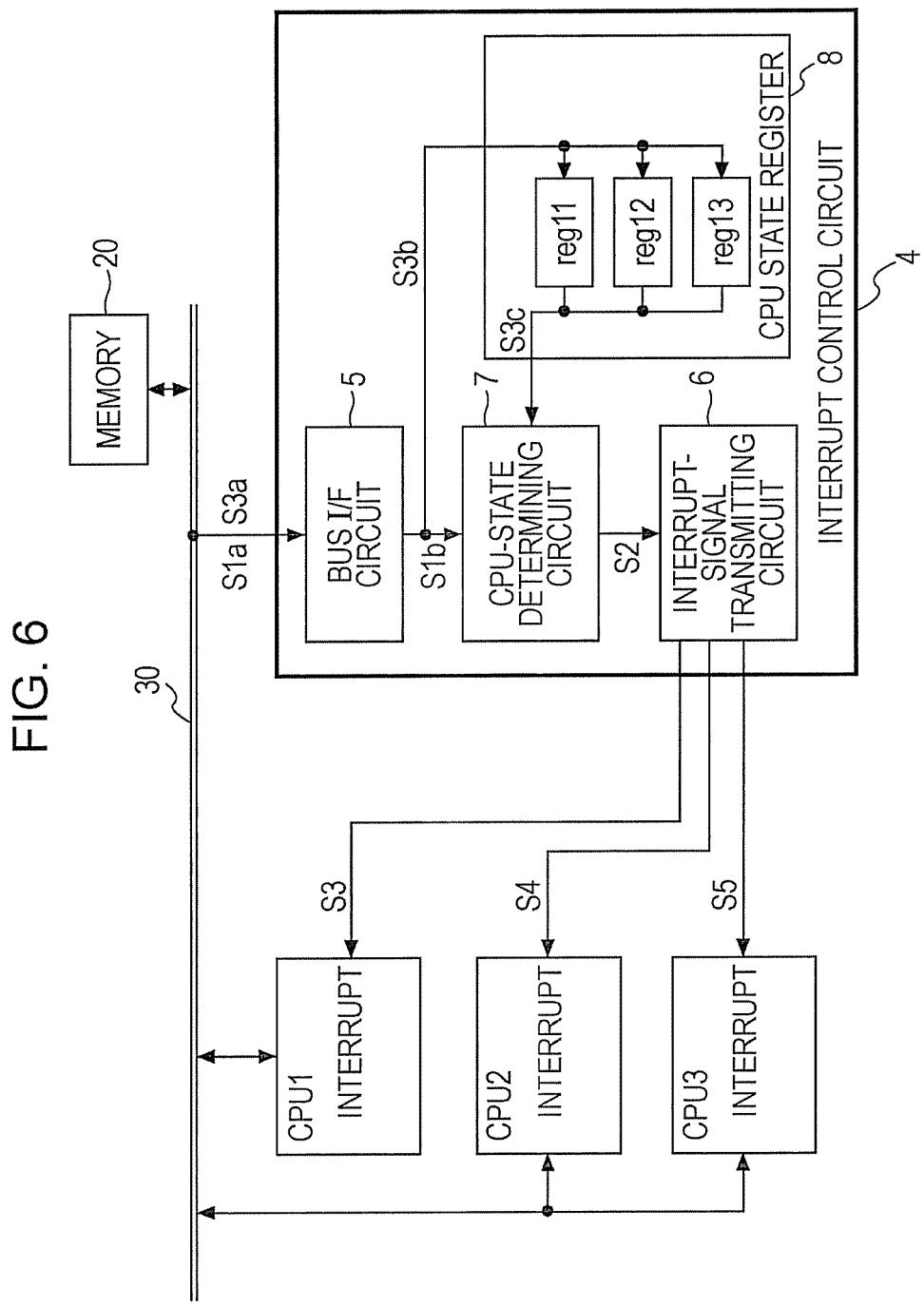
FIG. 6 is a block diagram of an example of the configuration of a multiprocessor system according to a second embodiment.

FIG. 6 is a block diagram of an example of the configuration of a multiprocessor system according to a second embodiment. The multiprocessor system depicted in FIG. 6 differs from the multiprocessor system of the first embodiment depicted in FIG. 1 in that each CPU does not output the sleep signal and the interrupt control circuit 4 includes a CPU state register 8. The same reference numerals are used in FIG. 6 to identify the same components depicted in FIG. 1. A description of such components is omitted herein.

An outline of the second embodiment will now be described. The interrupt destination CPU is determined in the same manner as in the method of changing the interrupt destination described above in the first embodiment in response to the interrupt request in the second embodiment. However, the second embodiment differs from the first embodiment in the method of determining the power consumption state of each CPU. Specifically, the power consumption state of each CPU is determined by referring to a CPU state signal S3c output from the CPU state register 8 in which the power consumption state of the CPU is stored. The sleep signal output from each CPU is referred to in the first embodiment while the CPU state signal output from the CPU state register 8 is referred to in the second embodiment in order to determine the power consumption state of the interrupt destination CPU.

The function and the operation of each component composing the multiprocessor system of the second embodiment will now be described. The power consumption state of each CPU is indicated in the CPU state register 8 in the interrupt control circuit 4. The CPU state register 8 includes a register reg11, a register reg12, and a register reg13 corresponding to the CPU 1, the CPU 2, and the CPU 3, respectively.

Each CPU transmits a state setting signal S3a indicating that the CPU is to be in the sleep state to the interrupt control circuit 4 through the bus 30 before the CPU enters the sleep state. The bus interface circuit 5 interprets the state setting signal S3a and transmits a state setting signal S3b to the register corresponding to the CPU from which the state setting signal S3a is transmitted in the CPU state register 8. The value of the register corresponding to the state setting signal S3b in the CPU state register 8 is set to the value indicating the sleep state. The CPU state register 8 transmits the set register state to the CPU-state determining circuit 7 as the CPU state signal S3c. Then, the CPU from which the state setting signal S3a is transmitted enters the sleep state. The CPU in the sleep state transmits the state setting signal S3a in the above manner when the CPU recovers from the sleep state and updates the value of the register with a value indicating that the CPU has recovered from the sleep state.

As described above, the CPU-state determining circuit 7 refers to the value of the register, which is received as the CPU state signal S3c and which indicates the sleep state of each CPU, to determine the sleep state of the CPU. The CPU-state determining circuit 7 determines the sleep state of each CPU on the basis of the sleep signal output from the CPU in the first embodiment while the CPU-state determining circuit 7 determines the sleep state of each CPU on the basis of the CPU state signal S3c output from the CPU state register 8 in the second embodiment. Accordingly, the CPU-state determining circuit 7 refers to the CPU state signal S3c in response to the interrupt request signal S1b to determine the sleep state of each CPU. If the interrupt-request destination CPU is in the normal operation state, the CPU-state determining circuit 7 selects the interrupt-request destination CPU as the interrupt destination CPU. If the interrupt-request destination CPU is in the sleep state, the CPU-state determining circuit 7 changes the interrupt destination CPU to another CPU different from the interrupt-request destination CPU.

The interrupt destination CPU may be changed in accordance with the interrupt-destination priority order table, as in the first embodiment. The CPU-state determining circuit 7 determines the interrupt destination CPU in the above manner and outputs the determination result as the interrupt destination signal S2.

The interrupt-signal transmitting circuit 6 transmits the interrupt signal S3, S4, or S5 to the CPU corresponding to the received interrupt destination signal S2. The CPU that has received the interrupt signal stops the processing that is being performed by using the interrupt signal as a trigger and performs certain interrupt processing.

Figure 7:
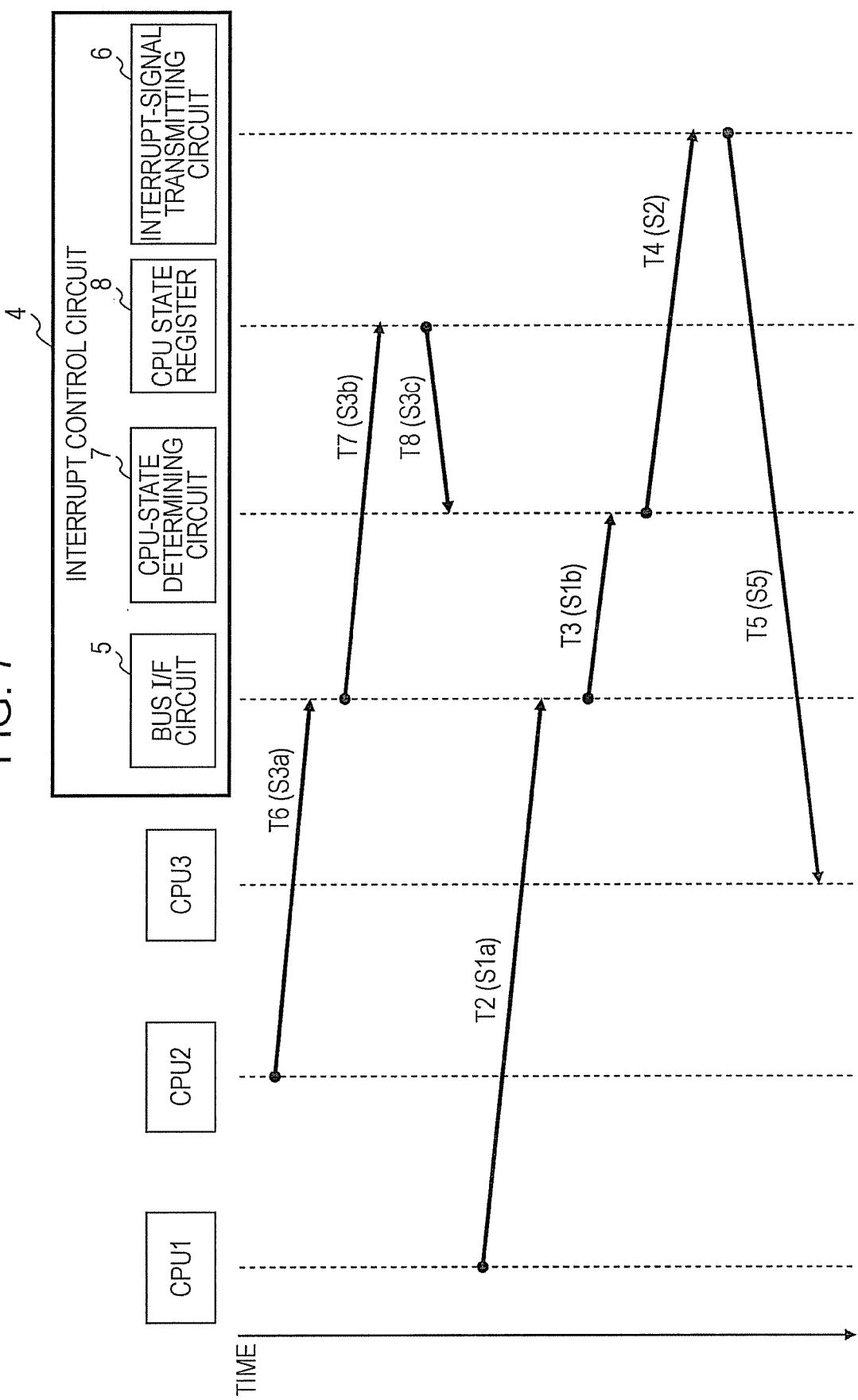
FIG. 7 illustrates the relationship between time and the flow of signals transmitted to the components in the multiprocessor system according to the second embodiment.

An example of an interrupt operation process will now be specifically described with reference to FIGS. 6 and 7. FIG. 7 illustrates the relationship between time and the flow of signals transmitted to the components in the multiprocessor system according to the second embodiment. Reference numerals in parentheses in FIG. 7 correspond to the transmission and reception signals depicted in FIG. 6. It is assumed here that, after the CPU 2 transmits the state setting signal S3a to be in the sleep state when all the CPUs are normally operating, the CPU 1 submits the interrupt request to the CPU 2. It is also assumed that the CPU-state determining circuit 7 changes the interrupt destination in accordance with the interrupt-destination priority order table depicted in FIG. 2.

Referring to FIG. 7, in Step T6, the CPU 2 transmits the state setting signal S3a to the interrupt control circuit 4 through the bus 30 before the CPU 2 enters the sleep state. In Step T7, the bus interface circuit 5 in the interrupt control circuit 4 interprets the state setting signal S38 and transmits the state setting signal S3b to the register reg12 corresponding to the CPU 2 in the CPU state register 8. The register reg12 in the CPU state register 8 is set to the sleep state. In Step T8, the CPU state register 8 transmits the CPU state signal S3c indicating that the register reg12 is set to the sleep state to the CPU-state determining circuit 7. Then, the CPU 2 enters the sleep state.

After Step T8, Steps T2, T3, T4, and T5 are performed in the same manner as in FIG. 5. However, the determination of the power consumption state of each CPU is based on the CPU state signal S3c.

Each CPU outputs the sleep signal in the first embodiment. This is because the individual CPU includes a register indicating its sleep state and outputs the sleep signal in accordance with the value of the register. Accordingly, the difference in configuration between the first embodiment and the second embodiment is found in that the register indicating the power consumption state of each CPU is provided in the CPU or the interrupt control circuit 4. In addition, since the value of the register indicating the power consumption state of each CPU may be set via the bus 30 in the second embodiment, the second embodiment has the advantage of eliminating the need for the wiring for the sleep signal transmitted from each CPU, compared with the first embodiment.

[Third Embodiment]

Figure 8:
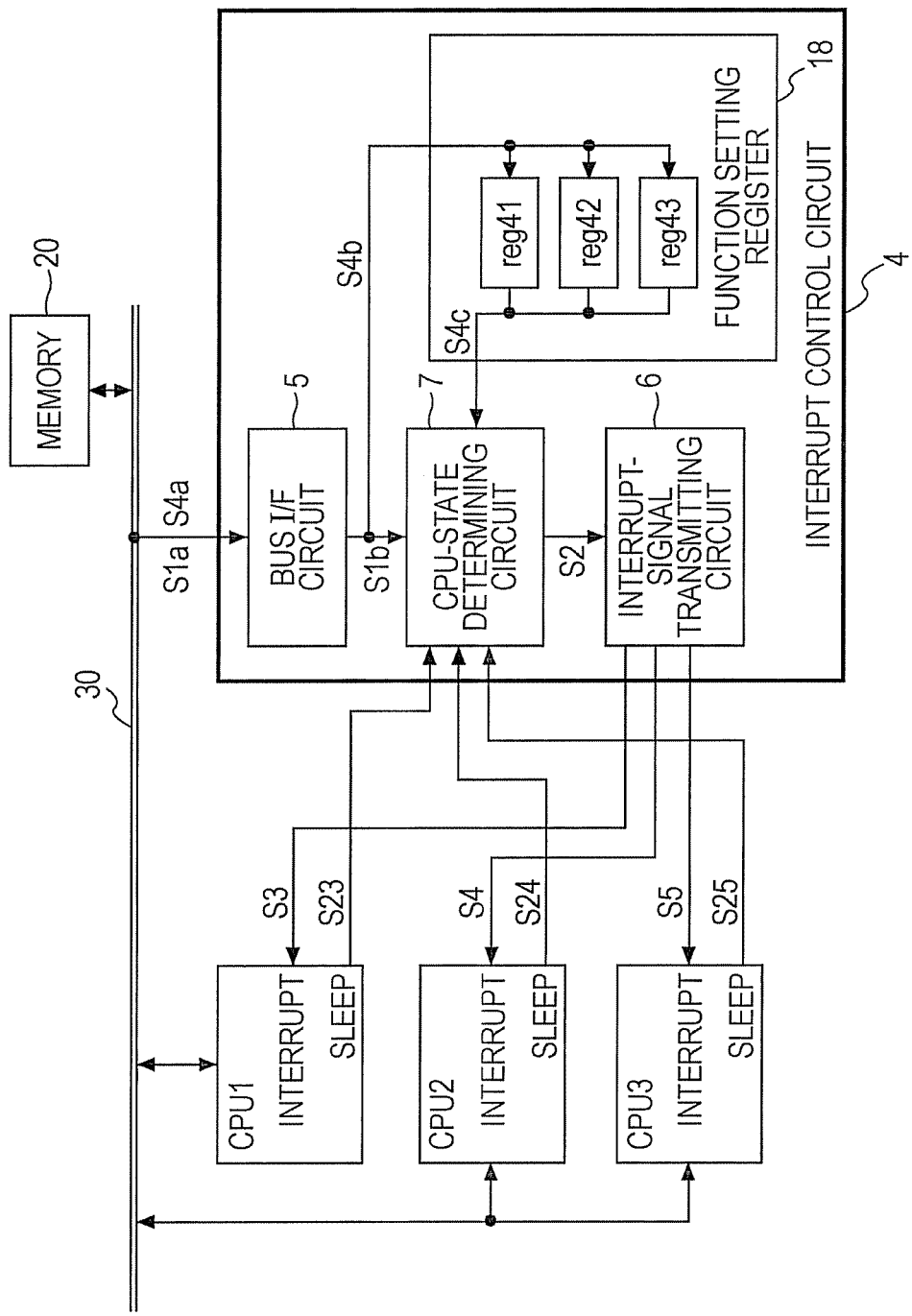
FIG. 8 is a block diagram of an example of the configuration of a multiprocessor system according to a third embodiment.

FIG. 8 is a block diagram of an example of the configuration of a multiprocessor system according to a third embodiment. The multiprocessor system depicted in FIG. 8 differs from the multiprocessor system of the first embodiment depicted in FIG. 1 in that the interrupt control circuit 4 includes a function setting register 18. The same reference numerals are used in FIG. 8 to identify the same components depicted in FIG. 1. A description of such components is omitted herein.

An outline of the third embodiment will now be described. The interrupt destination CPU is changed to another CPU if the interrupt destination CPU is in the sleep state in the same manner as in the method of changing the interrupt destination described above in the first embodiment in response to the interrupt request in order to determine the interrupt destination CPU. However, whether the change of the interrupt destination is enabled or disabled for every CPU may be set in the function setting register 18. The CPU-state determining circuit 7 selects the interrupt-request destination CPU as the interrupt destination CPU if the interrupt-request destination CPU is in the normal operation state. In contrast, if the interrupt-request destination CPU is in the sleep state, the CPU-state determining circuit 7 refers to the function setting register 18. If the change of the interrupt destination is enabled, the CPU-state determining circuit 7 changes the interrupt destination in accordance with the interrupt-destination priority order table. If the change of the interrupt destination is disabled, the CPU-state determining circuit 7 does not change the interrupt destination and forcedly submits the interrupt request to the interrupt-request destination CPU.

The function and the operation of each component composing the multiprocessor system of the third embodiment will now be described. The function setting register 18 in the interrupt control circuit 4 includes a register reg41, a register reg42, a register reg43 corresponding to the CPU 1, the CPU 2, and the CPU 3, respectively. If the interrupt-request destination CPU is in the sleep state, the value indicating whether the change of the interrupt destination to another CPU is enabled or disabled is set in each of the registers reg41, reg42, and reg43. In the third embodiment, a register value "0" indicates that the change of the interrupt destination is disabled and a register value "1" indicates that the change of the interrupt destination is enabled.

The CPUs 1, 2, and 3 transmit a register setting signal S4a to interrupt control circuit 4 in order to set the values of the registers reg41, reg42, and reg43, respectively, in the function setting register 18. The bus interface circuit 5 determines the register setting destination CPU from the register setting signal S4a and transmits a register setting signal S4b to the register corresponding to the register setting destination CPU in the function setting register 18. The values of the registers reg41, reg42, and reg43 in the function setting register 18 are set to "0" or "1" in accordance with the register setting signal S4b. The function setting register 18 transmits a CPU setting signal S4c corresponding to the value of the register to the CPU-state determining circuit 7.

The sleep signals S23, S24, and S25 and the interrupt request signal S1a are similar to those in the first embodiment.

Figure 9:
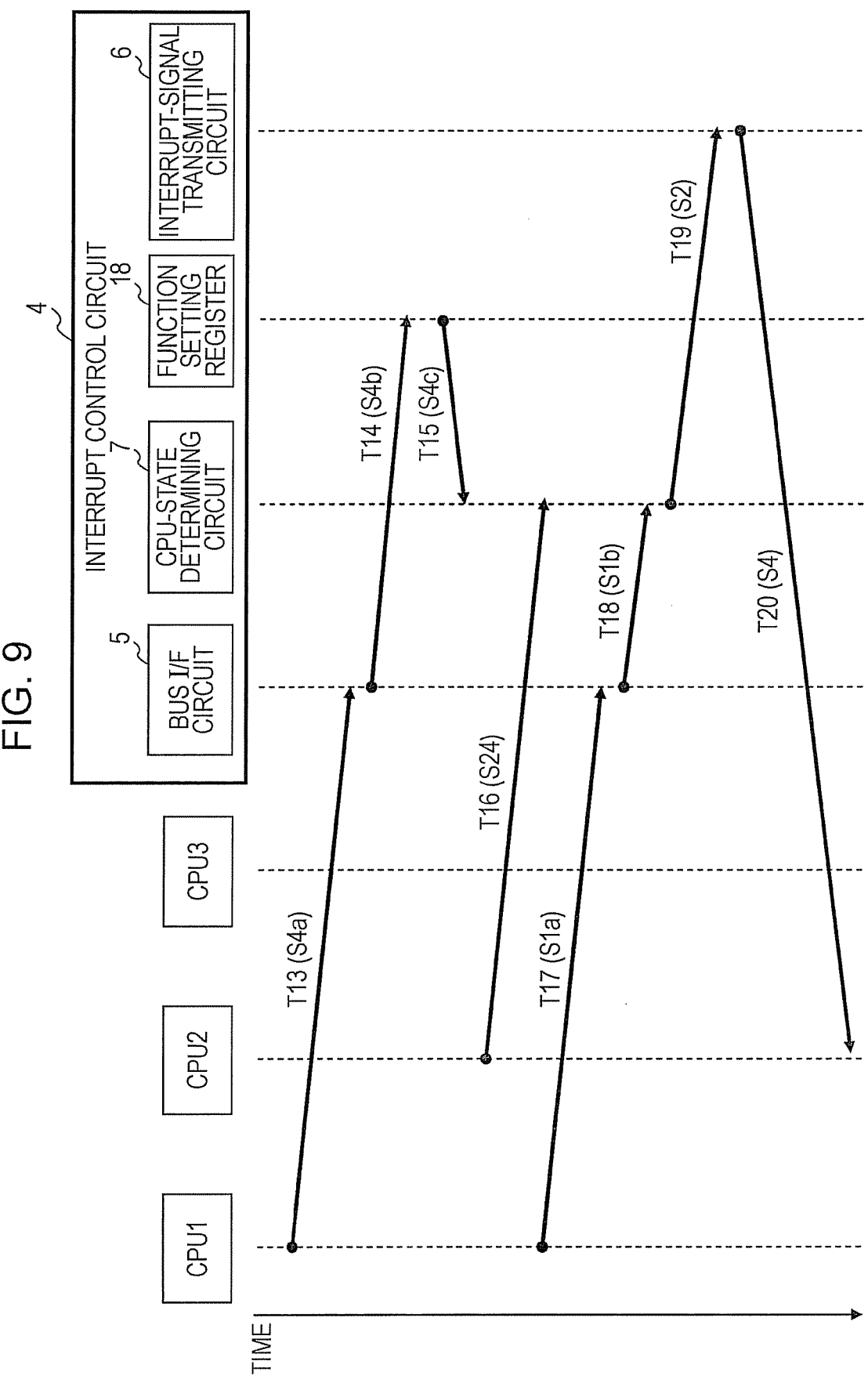
FIG. 9 illustrates the relationship between time and the flow of signals transmitted to the components in the multiprocessor system according to the third embodiment.

An example of an interrupt operation process will now be specifically described with reference to FIGS. 8 and 9. FIG. 9 illustrates the relationship between time and the flow of signals transmitted to the components in the multiprocessor system according to the third embodiment. Reference numerals in parentheses in FIG. 9 correspond to the transmission and reception signals depicted in FIG. 8. It is assumed here that, after the CPU 1 sets the register and the CPU 2 transmits the sleep signal S24 to be in the sleep state when all the CPUs are normally operating, the CPU 1 submits the interrupt request to the CPU 2. It is also assumed that the CPU-state determining circuit 7 changes the interrupt destination in accordance with the interrupt-destination priority order table depicted in FIG. 2.

Referring to FIG. 9, the CPU 1 sets each of the registers reg41, reg42, and reg43 in the function setting register 18 in order to set the enablement or the disablement of the automatic change of the interrupt destination. In Step T13, the CPU 1 transmits the register setting signal S4a to the interrupt control circuit 4 through the bus 30. In the example of the interrupt operation process in FIG. 9, the register reg41 is set to "1" (the change of the interrupt destination is enabled), the register reg42 is set to "0" (the change of the interrupt destination is disabled), and the register reg43 is set to "1" (the change of the interrupt destination is enabled). In Step T14, the bus interface circuit 5 interprets the register setting signal S4a and transmits the register setting signal S4b to each of the registers reg41, reg42, and reg43 corresponding to the CPUs 1, 2, and 3, respectively, in the function setting register 18 to set the registers reg41, reg42, and reg43. In Step T15, the function setting register 18 transmits the CPU setting signal S4c corresponding to the set register to the CPU-state determining circuit 7.

In Step T16, the CPU 2 transmits the sleep signal S24 indicating that the CPU 2 is in the sleep state to the CPU-state determining circuit 7 and enters the sleep state.

In Step T17, the CPU 1 transmits the interrupt request signal S1a to the bus interface circuit 5 in the interrupt control circuit 4 through the bus 30 in order to submit the interrupt request to the CPU 2. In Step T18, the bus interface circuit 5 determines that the interrupt request is submitted to the CPU 2 from the received interrupt request signal S1a and transmits the determination result to the CPU-state determining circuit 7 as the interrupt request signal S1b.

The CPU-state determining circuit 7 refers to the sleep signal S24 from the CPU 2 in response to the interrupt request to the CPU 2, indicated by the interrupt request signal S1b.

If the CPU-state determining circuit 7 determines that the CPU 2 is in the sleep state, the CPU-state determining circuit 7 changes the interrupt destination in accordance with the interrupt-destination priority order table depicted in FIG. 2. However, since the CPU setting signal S4c indicates that the register reg42 corresponding to the CPU 2 is set to "0" indicating that the change of the interrupt destination is disabled in this example, the CPU-state determining circuit 7 does not change the interrupt destination and selects the CPU 2 as the interrupt destination CPU despite the fact that the CPU 2 is in the sleep state.

In Step T19, the CPU-state determining circuit 7 transmits the interrupt destination signal S2 indicating the CPU to which the interrupt signal is transmitted to the interrupt-signal transmitting circuit 6.

In Step T20, the interrupt-signal transmitting circuit 6 transmits the interrupt signal S4 to the CPU 2 in response to the received interrupt destination signal S2. The CPU 2, which has received the interrupt destination signal S2, returns from the sleep state to the normal operation state by using the interrupt signal S4 as a trigger and takes over the processing that has been performed by the CPU 1.

Since the function setting register 18 is used to manage the interrupt in the third embodiment, it is possible not only to control the interrupt in accordance with the power consumption state of each CPU but also to manage the interrupt for every CPU. For example, in a multiprocessor system including multiple CPUs having different processing speeds, the values of the registers for the CPUs that perform high-speed processing and that have higher power consumptions are set to "1" (the change of the interrupt destination is enabled) and the values of the registers for the CPUs having lower power consumptions are set to "0" (the change of the interrupt destination is disabled). In this case, if the CPU which has a higher power consumption and to which the interrupt request is submitted is in the sleep state, the interrupt destination may be changed to another CPU having a lower power consumption. In addition, if a predetermined condition is satisfied, for example, if specific high-speed processing appropriate for the CPU having a higher power consumption is required, the value of the register for the CPU having a higher power consumption may be set to "0" (the change of the interrupt destination is disabled) to forcedly submit the interrupt request to the CPU having a higher power consumption despite the fact that the CPU is in the sleep state.

[Fourth Embodiment]

A multiprocessor system according to a fourth embodiment has a configuration in which the configurations of the first to third embodiments are integrated with each other. In the fourth embodiment, the interrupt control circuit 4 includes the CPU state register 8 and the function setting register 18 and each CPU does not output the sleep signal.

In other words, the sleep state of each CPU is determined on the basis of the CPU state signal S3c in the second embodiment depicted in FIG. 6, instead of the sleep signal in the third embodiment depicted in FIG. 8, in the fourth embodiment. The fourth embodiment is the same as the third embodiment except the above points.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM. ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A multiprocessor system configured as a system LSI, the multiprocessor system comprising:
    a plurality of processor units each transmitting an interrupt request signal indicating an interrupt request for which an interrupt-request destination processor unit is specified and receiving an interrupt signal; and
    an interrupt control circuit receiving the interrupt request signal from each of the plurality of processor units and transmitting the interrupt signal to each of the plurality of processor units,
    wherein, in response to the interrupt request signal transmitted from each of the plurality of processor units, the interrupt control circuit transmits the interrupt signal to the interrupt-request destination processor unit specified by the interrupt request signal if the specified interrupt-request destination processor unit is not in a low power consumption state and transmits the interrupt signal to another processor unit different from the processor unit specified by the interrupt request signal if the specified interrupt-request destination processor unit is in the low power consumption state,
    wherein the interrupt control circuit includes a function setting register indicating whether the change of the interrupt destination to each of the plurality of processor units is enabled or disabled, and
    wherein the interrupt control circuit transmits the interrupt signal to the interrupt-request destination processor unit if the function setting register indicates that the change of the interrupt destination is disabled even when the interrupt-request destination processor unit specified by the interrupt request signal is in the low power consumption state.

2. The multiprocessor system configured as a system LSI according to claim 1,
    wherein the other processor unit is not in the low power consumption state.

3. The multiprocessor system configured as a system LSI according to claim 2,
    wherein, if all the processor units are in the low power consumption state, the interrupt signal is transmitted to the interrupt-request destination processor unit.

4. The multiprocessor system configured as a system LSI according to claim 1, further comprising:
    an interrupt-destination priority order table in which an interrupt priority order of each processor unit is specified,
    wherein the priority order in the interrupt-destination priority order table is set in the ascending order of a power consumption of each processor unit.

5. A multiprocessor system comprising:
a plurality of processor units transmitting an interrupt request signal and receiving an interrupt signal;
an interrupt control circuit receiving the interrupt request signal from one of the plurality of processor units and transmitting the interrupt signal to one of the plurality of processor units; and
an interrupt destination priority order table in which an interrupt priority order of the plurality of processor units is specified,
wherein the interrupt control circuit further includes a function setting register indicating whether the change of the interrupt destination to one of the plurality of processor units is enabled or disabled,
wherein, in response to the interrupt request signal transmitted from one of the plurality of processor units, the interrupt control circuit selects one of the plurality of processor units according to the interrupt priority order if the function setting register indicates that the change of the interrupt destination is disabled and transmits the interrupt signal to the detected processor unit.

* * * * *